(12) United States Patent
Itoh (10) Patent No.: US 11,418,909 B2
(45) Date of Patent: Aug. 16, 2022

(54) DRIVER-ASSISTANCE DEVICE, WEARABLE DEVICE, DRIVER-ASSISTANCE METHOD, AND COMPUTER-READABLE RECORDING MEDIUM

(71) Applicant: TOYOTA JIDOSHA KABUSHIKI KAISHA, Toyota (JP)

(72) Inventor: Kazuhiro Itoh, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

(21) Appl. No.: 16/672,570

(22) Filed: Nov. 4, 2019

(65) Prior Publication Data

US 2020/0162844 A1    May 21, 2020

(30) Foreign Application Priority Data

Nov. 20, 2018 (JP) .............................. JP2018-217670

(51) Int. Cl.
*H04W 4/02* (2018.01)
*H04B 17/318* (2015.01)
*H04B 1/3827* (2015.01)
*H04W 4/40* (2018.01)
*H04N 5/225* (2006.01)
*G02B 27/01* (2006.01)
*G06V 20/59* (2022.01)

(52) U.S. Cl.
CPC ........ *H04W 4/023* (2013.01); *G02B 27/0172* (2013.01); *G06V 20/593* (2022.01); *H04B 1/385* (2013.01); *H04B 17/318* (2015.01); *H04N 5/2253* (2013.01); *H04W 4/40* (2018.02); *G02B 2027/014* (2013.01); *G02B 2027/0138* (2013.01); *G02B 2027/0178* (2013.01); *H04B 2001/3866* (2013.01)

(58) Field of Classification Search
None
See application file for complete search history.

(56) References Cited

U.S. PATENT DOCUMENTS

| | | | |
|---|---|---|---|
| 8,885,877 B2 | 11/2014 | Publicover et al. | |
| 11,203,355 B2 * | 12/2021 | Penilla | H04W 4/40 |
| 2013/0135118 A1 * | 5/2013 | Ricci | G06F 21/42 |
| | | | 340/932.2 |
| 2014/0046591 A1 * | 2/2014 | Boldyrev | H04L 12/1845 |
| | | | 701/533 |

(Continued)

FOREIGN PATENT DOCUMENTS

JP      2003-179917 A      6/2003
JP      2009-214591 A      9/2009

(Continued)

OTHER PUBLICATIONS

Karatas et al., "Leveraging Wearables for Steering and Driver Tracking" (Year: 2016).*

*Primary Examiner* — Hilina K Demeter
(74) *Attorney, Agent, or Firm* — Oliff PLC (57) ABSTRACT

A driver-assistance device includes: a memory; and a processor including hardware. The processor is configured to perform switching control on an operation of a function that is included in a wearable device to be worn by a user and that acquires information on privacy, based on an occupancy state indicating a relative positional relation between a vehicle and the user.

12 Claims, 8 Drawing Sheets

(56) References Cited

U.S. PATENT DOCUMENTS

| | | | |
|---|---|---|---|
| 2015/0088335 A1* | 3/2015 | Lambert | G08G 1/20 |
| | | | 701/1 |
| 2015/0127215 A1 | 5/2015 | Chatterjee | |
| 2015/0169968 A1* | 6/2015 | Michmerhuizen | |
| | | | G08B 13/19647 |
| | | | 348/148 |
| 2015/0191178 A1* | 7/2015 | Roy | H04W 4/027 |
| | | | 701/36 |
| 2017/0036673 A1* | 2/2017 | Lee | A61B 3/112 |
| 2018/0280762 A1 | 10/2018 | Tsukahara et al. | |
| 2019/0042575 A1* | 2/2019 | Ashkenazi | G01C 21/165 |
| 2020/0111374 A1* | 4/2020 | Yocam | H04W 4/40 |
| 2020/0162836 A1* | 5/2020 | Beaurepaire | G06F 16/9537 |
| 2020/0177841 A1* | 6/2020 | Yin | H04N 7/181 |

FOREIGN PATENT DOCUMENTS

| | | |
|---|---|---|
| JP | 2010-062778 A | 3/2010 |
| JP | 5316995 B2 | 10/2013 |
| JP | 2015-089808 A | 5/2015 |
| JP | 2017-068595 A | 4/2017 |
| JP | 6308940 B2 | 4/2018 |
| JP | 2018-092415 A | 6/2018 |

\* cited by examiner

DRIVER-ASSISTANCE DEVICE, WEARABLE DEVICE, DRIVER-ASSISTANCE METHOD, AND COMPUTER-READABLE RECORDING MEDIUM

CROSS-REFERENCE TO RELATED APPLICATION(S)

The present application claims priority to and incorporates by reference the entire contents of Japanese Patent Application No. 2018-217670 filed in Japan on Nov. 20, 2018.

BACKGROUND

1. Technical Field

The present disclosure relates to a driver-assistance device, a wearable device, a driver-assistance method, and a computer-readable recording medium.

2. Related Art

There is known a wearable device that forms an image on a lens of glasses to cause a user to recognize the image (see, for example, JP 6308940 B2). Such a wearable device includes a camera that images an object such as surroundings of the user wearing the wearable device or the others and is used to project images consecutively taken by the camera while the user wears the wearable device or to detect an object around the user.

SUMMARY

It is highly likely that such a wearable device will be widely used in daily life, and it is expected that a user wearing the wearable device will drive a vehicle. In this case, the wearable device can use new contents or services provided by the vehicle or a server by transmitting various pieces of information containing an acquired image to the vehicle or the server via a network.

However, with the development of high-speed, high-capacity communication, the various pieces of information acquired by the wearable device are transmitted to the vehicle in which the user is present or transmitted to the server via the network, which may cause such information to be used in an unintended manner for the user wearing the wearable device and the others whose image has been captured. For this reason, it is desirable to provide a driver-assistance device, a wearable device, a driver-assistance method, and a computer-readable recording medium that allow an operation taking into consideration privacy of a user wearing the wearable device and the others to be performed.

In some embodiments, a driver-assistance device includes: a memory; and a processor including hardware. The processor is configured to perform switching control on an operation of a function that is included in a wearable device to be worn by a user and that acquires information on privacy, based on an occupancy state indicating a relative positional relation between a vehicle and the user.

In some embodiments, provided is a wearable device capable of bidirectionally communicating with a vehicle and to be worn by a user. The wearable device includes: a communicator configured to receive an occupancy state indicating a relative positional relation between the vehicle and the user; and a processor including hardware. The processor is configured to perform switching control on an operation of a function that is included in a wearable device to be worn by a user and that acquires information on privacy, based on the occupancy state.

In some embodiments, provided is a driver-assistance method of a driver-assistance device configured to assist a user of a vehicle in driving. The method includes: acquiring an occupancy state indicating a relative positional relation between the vehicle and the user; and performing switching control on an operation of a function that is included in a wearable device to be worn by a user and that acquires information on privacy, based on the occupancy state read from a memory.

In some embodiments, provided is a driver-assistance method of a wearable device capable of bidirectionally communicating with a vehicle and to be worn by a user. The method includes: receiving an occupancy state indicating a relative positional relation between the vehicle and the user; and performing switching control on an operation of a function that is included in a wearable device to be worn by a user and that acquires information on privacy, based on the occupancy state read from a memory.

In some embodiments, provided is a non-transitory computer-readable recording medium with an executable program stored thereon. The program causes a driver-assistance device configured to assist a user of a vehicle in driving to execute: acquiring an occupancy state indicating a relative positional relation between the vehicle and the user; and performing switching control on an operation of a function that is included in a wearable device to be worn by a user and that acquires information on privacy, based on the occupancy state read from a memory.

In some embodiments, provided is a non-transitory computer-readable recording medium with an executable program stored thereon. The program causes a wearable device capable of bidirectionally communicating with a vehicle and to be worn by a user to execute: receiving an occupancy state indicating a relative positional relation between the vehicle and the user; and performing switching control on an operation of a function that is included in a wearable device to be worn by a user and that acquires information on privacy, based on the occupancy state read from a memory.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, a description will be given in detail of embodiments of the disclosure with reference to the drawings. Note that the disclosure is not limited to the following embodiments. Further, in the following description, the same parts will be denoted by the same reference numerals.

First Embodiment

Figure 1:
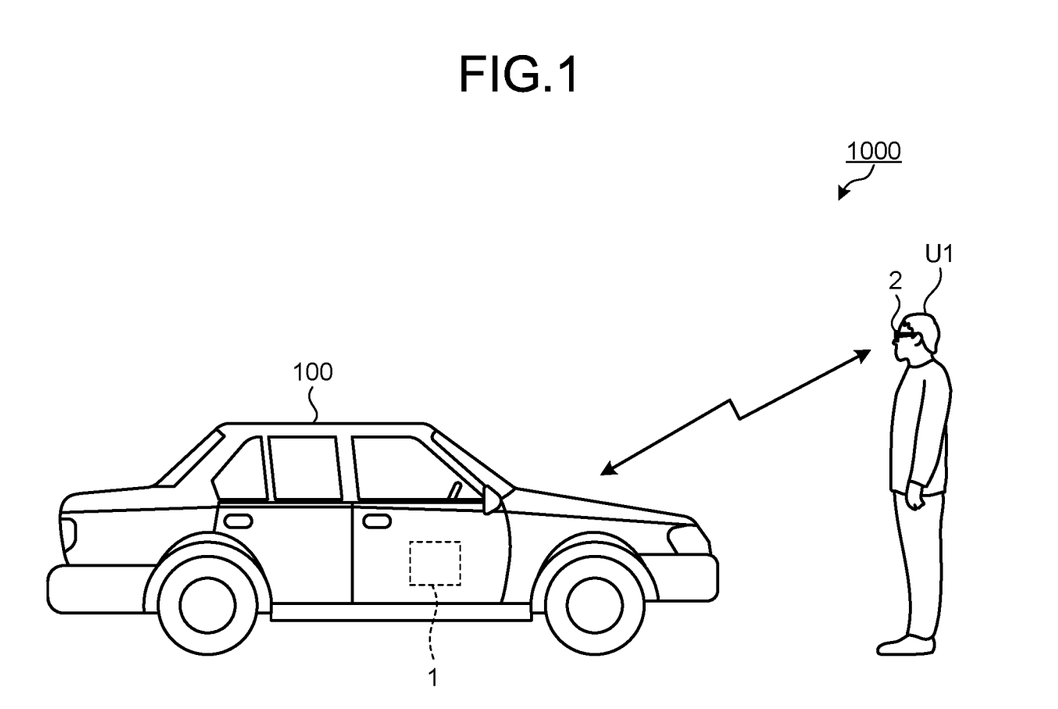
FIG. 1 is a diagram illustrating a schematic configuration of a driver-assistance system according to a first embodiment.
Figure 2:
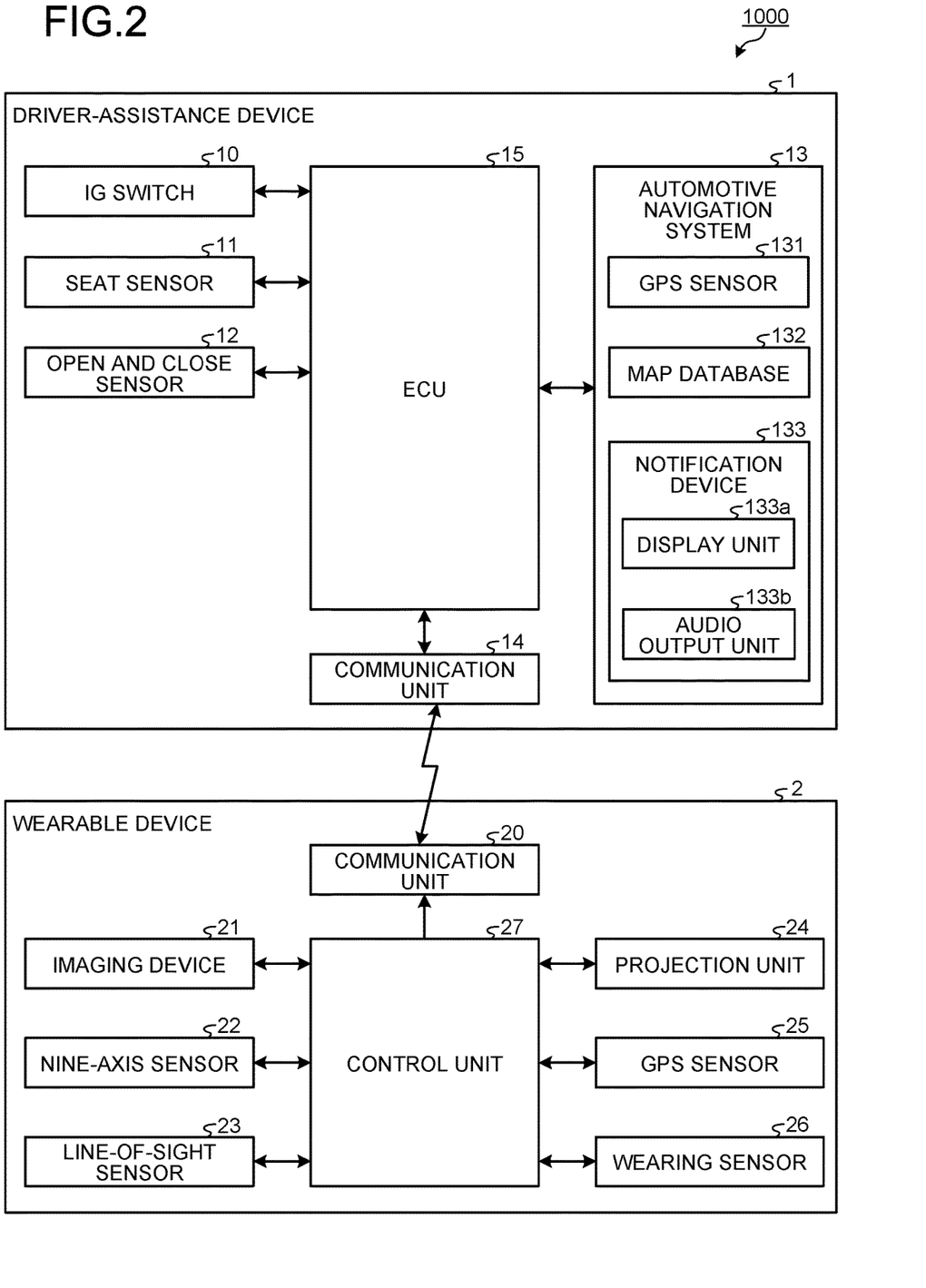
FIG. 2 is a block diagram illustrating a functional configuration of the driver-assistance system according to the first embodiment.

FIG. 1 is a diagram illustrating a schematic configuration of a driver-assistance system according to a first embodiment. FIG. 2 is a block diagram illustrating a functional configuration of the driver-assistance system according to the first embodiment. A driver-assistance system 1000 illustrated in FIG. 1 and FIG. 2 includes a driver-assistance device 1 provided in a vehicle 100 and a wearable device 2 that can be worn by a user U1 and bidirectionally communicates with the driver-assistance device 1 in accordance with a predetermined communication standard.

Configuration of Driver-Assistance Device

First, a description will be given of a configuration of the driver-assistance device 1. The driver-assistance device 1 illustrated in FIG. 1 and FIG. 2 is mounted on the vehicle 100 and cooperates with other electronic control units (ECUs) mounted on the vehicle 100 to assist a driver in the vehicle 100 in driving. The driver-assistance device 1 illustrated in FIG. 1 and FIG. 2 includes an ignition switch 10 (hereinafter, referred to as an "IG switch 10"), a seat sensor (automotive occupant detection sensor) 11, and an open and close sensor 12 (door open and close sensor), an automotive navigation system 13, a communication unit 14, an ECU 15, and the like.

The IG switch 10 receives activation and deactivation of an electrical system such as an engine or a motor. The IG switch 10 activates an IG power supply upon being turned to an on state and deactivates the IG power supply upon being turned to an off state.

The seat sensor 11 detects a seating state of a driver's seat and outputs the detection result to the ECU 15. The seat sensor 11 includes a load detection device, a pressure sensor, or the like disposed below a seat surface.

The open and close sensor 12 detects opening and closing of a door where the user to get in and out and outputs the detection result to the ECU 15. The open and close sensor 12 includes, for example, a push switch.

The automotive navigation system 13 includes a global positioning system (GPS) sensor 131, a map database 132, and a notification device 133.

The GPS sensor 131 receives signals from a plurality of GPS satellites and transmission antennas and calculates a position of the vehicle 100 based on the signals thus received. The GPS sensor 131 includes a GPS receiving sensor or the like. Note that a plurality of the GPS sensors 131 may be mounted to increase direction accuracy of the vehicle 100.

The map database 132 holds various pieces of map data. The map database 132 may include a recording medium such as a hard disk drive (HDD) or a solid state drive (SSD).

The notification device 133 may include a display unit 133a that displays an image, a motion image, and character information, and an audio output unit 133b that generates a sound such as a voice or an alarm sound or bone conduction. The display unit 133a includes a display such as a liquid crystal display or an organic EL display. The audio output unit 133b includes a speaker or the like.

The automotive navigation system 13 configured as described above superimposes the current position of the vehicle 100 acquired by the GPS sensor 131 on the map data stored in the map database 132 to notify the driver of information on a road where the vehicle 100 is currently traveling, a route to a destination, and the like via the display unit 133a and the audio output unit 133b.

The communication unit 14 transmits and receives, under control of the ECU 15, various pieces of information to and from a server (not illustrated) via a base station and a network in accordance with a predetermined communication standard. Further, the communication unit 14 transmits and receives various pieces of information to and from the wearable device 2, another vehicle, a user terminal device, or the like in accordance with a predetermined communication standard. The communication unit 14 includes a plurality of communication modules capable of radio communication.

The ECU 15 controls an operation of each unit of the driver-assistance device 1. The ECU 15 includes a memory and a processor including hardware such as a CPU. The ECU 15 performs, based on an occupancy state indicating a relative positional relation between the vehicle 100 and the user, switching control on an operation of a function of acquiring information on privacy owned by the wearable device 2 worn by the user. Specifically, the ECU 15 determines whether a distance between the driver-assistance device 1 and the wearable device 2 is equal to or greater than a predetermined value, and, when determining that the distance is equal to or greater than the predetermined value, the ECU 15 determines that the user is outside the vehicle 100 and stops the function of acquiring information on privacy owned by the wearable device 2. Further, when determining that the distance is less than the predetermined value, the ECU 15 determines that the user is in the vehicle 100 and starts the function of acquiring information on privacy owned by the wearable device 2.

Herein, the predetermined value is, for example, a distance that a radio wave emitted from a remote control key for opening and closing the door of the vehicle 100 can travel. Further, the predetermined value can be set as appropriate, and may be, for example, a distance corresponding to a value specified for each of various countries. Further, "in the vehicle" corresponds to either a state where the user is seated in the vehicle 100 or a state where the user is located at a distance less than the predetermined value from the vehicle 100. Further, "outside the vehicle" corresponds to a state where the user is located at a distance equal to or greater than the predetermined value from the vehicle 100.

Further, the function of acquiring information on privacy includes at least one of a motion-image taking function of taking a motion image by the wearable device 2, a recording (saving) function of recording motion image data produced from the motion image taken by the wearable device 2, a transmitting function of transmitting, to the driver-assistance device 1 or the server, at least one of the motion image data captured by the wearable device, position information acquired by the wearable device 2, and vital information on the user wearing the wearable device 2, an acquiring function of acquiring the position information by the wearable device 2, and a projecting function of projecting an image by the wearable device 2. Note that, in the following description, the motion-image taking function of taking a motion image by the wearable device 2 will be given as an example of the function of acquiring information on privacy. Note that, according to the first embodiment, the ECU 15 functions as a processor.

Configuration of Wearable Device

Figure 3:
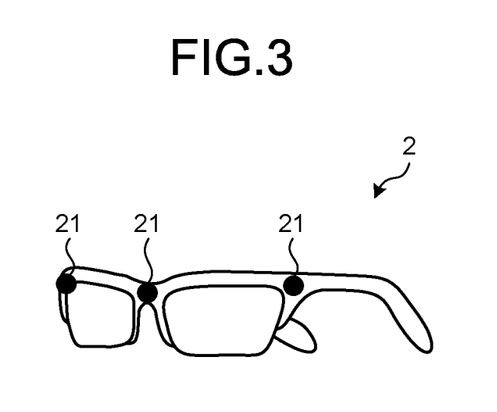
FIG. 3 is a diagram illustrating a schematic configuration of a wearable device according to the first embodiment.

Next, a description will be given of a configuration of the wearable device 2. FIG. 3 is a diagram illustrating a schematic configuration of the wearable device 2. The wearable device 2 illustrated in FIG. 1 to FIG. 3 is a glasses-type device that can be worn by the user U1 who is a driver and is capable of providing augmented reality (AR). Furthermore, the wearable device 2 is a device that transmits light in a visual field of the user and forms an image on a retina of the user so as to allow the user to view a virtual image in the visual field of the user. Furthermore, the wearable device 2 transmits information containing the motion image data and the like to the driver-assistance device 1 and receives driver-assistance information from the driver-assistance device 1. The wearable device 2 includes a communication unit 20, an imaging device 21, a nine-axis sensor 22, a line-of-sight sensor 23, a projection unit 24, a GPS sensor 25, a wearing sensor 26, a control unit 27, and the like.

The communication unit 20 transmits and receives, under control of the control unit 27, various pieces of information to and from the driver-assistance device 1 or the server via a network in accordance with a predetermined communication standard. The communication unit 20 includes a communication module capable of radio communication.

A plurality of the imaging devices 21 may be provided as illustrated in FIG. 3. The imaging device 21 produces image data by imaging, for example, a scene in a direction of a line of sight of the user and outputs the image data to the control unit 27 under the control of the control unit 27. The imaging device 21 includes an optical system including one or a plurality of lenses, a CCD or a CMOS that receives light representing an object image that results from collecting light with the optical system to produce the image data, and the like.

The nine-axis sensor 22 includes a three-axis gyro sensor, a three-axis acceleration sensor, and a three-axis geomagnetic sensor. The nine-axis sensor 22 detects an angular velocity and acceleration applied to the wearable device 2 and outputs the detection result to the control unit 27. Further, the nine-axis sensor 22 detects an absolute azimuth angle by detecting a magnetic field and outputs the detection result to the control unit 27.

The line-of-sight sensor 23 detects the direction of the line of sight of the user who is a wearer of the wearable device 2 and outputs the detection result to the control unit 27. The line-of-sight sensor 23 includes an optical system, a CCD or CMOS, a memory, and a processor including hardware such as a CPU or a GPU. The line-of-sight sensor 23 detects both a non-moving part of the eyes of the driver as a reference point (for example, an inner corner) using, for example, known template matching and a moving part of the eyes (for example, an iris) as a moving point to detect the direction of the line of sight of the driver based on a positional relation between the reference point and the moving point.

The projection unit 24 projects an image, a motion image, and character information onto a wearable device display unit (for example, a lens unit) or a retina or lens of the driver under the control of the control unit 27. The projection unit 24 includes an RGB laser beam that emits each of RGB laser beams, a MEMS mirror that reflects a laser beam, a reflection mirror that projects the laser beam reflected off the MEMS mirror onto the retina of the driver, and the like.

The GPS sensor 25 receives signals from a plurality of GPS satellites and calculates a position of the wearable device 2 based on the signals thus received. The GPS sensor 25 outputs the position of the wearable device 2 thus calculated to the control unit 27. The GPS sensor 25 includes a GPS reception sensor, or the like.

The wearing sensor 26 detects a wearing state of the user and outputs the detection result to the control unit 27. The wearing sensor 26 includes, for example, a pressure sensor that detects pressure generated when the user is wearing the wearable device 2, and a vital sensor that detects vital information such as a user's body temperature, pulse, brain waves, blood pressure, and sweating state.

The control unit 27 controls an operation of each unit of the wearable device 2. The control unit 27 includes a memory, and a processor including hardware such as a CPU.

Processing in Driver-Assistance Device

Figure 4:
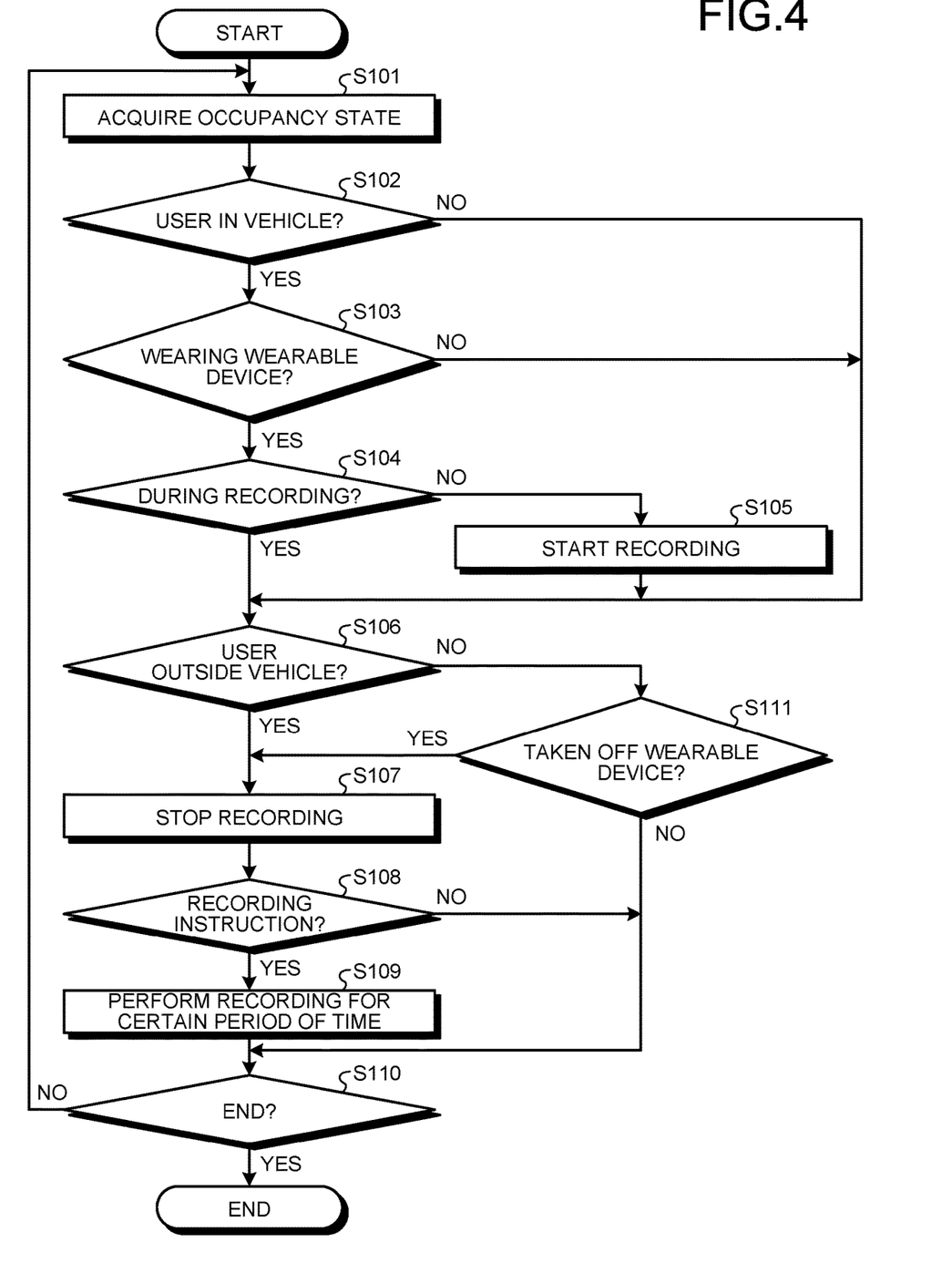
FIG. 4 is a flowchart illustrating an outline of processing to be executed by a driver-assistance device according to the first embodiment.

Next, a description will be given of processing to be executed by the driver-assistance device 1. FIG. 4 is a flowchart illustrating an outline of the processing to be executed by the driver-assistance device 1.

As illustrated in FIG. 4, the ECU 15 acquires the occupancy state (Step S101). Specifically, the ECU 15 acquires, as the occupancy state indicating the relative positional relation between the vehicle 100 and the user, the position information on the wearable device 2 from the GPS sensor 25 of the wearable device 2 acquired via the communication unit 14, state information on the IG power supply from the IG switch 10, the detection result of the seat sensor 11, and the detection result of the open and close sensor 12.

Subsequently, the ECU 15 determines whether the user is in the vehicle 100 (Step S102). For example, the ECU 15 calculates the distance between the vehicle 100 and the wearable device 2 based on the position information detected by the GPS sensor 25 of the wearable device 2 acquired via the communication unit 14 and the position information detected by the GPS sensor 131 of the automotive navigation system 13 and determines whether the distance thus calculated is equal to or greater than the predetermined value. The ECU 15 determines that the user is outside the vehicle 100 when the distance is equal to or greater than the predetermined value and determines that the user is in the vehicle 100 when the distance is less than the predetermined value. When the ECU 15 determines that the user is in the vehicle 100 (Step S102: Yes), the driver-assistance device 1 proceeds to Step S103 to be described later. In contrast, when the ECU 15 determines that the user is not in the vehicle 100 (Step S102: No), the driver-assistance device 1 proceeds to Step S106 to be described later.

In Step S103, the ECU 15 determines whether the user is wearing the wearable device 2. Specifically, the ECU 15 receives a wearing signal indicating the detection result from the wearing sensor 26 of the wearable device 2 via the communication unit 14 and determines whether the user is wearing the wearable device 2 based on the wearing signal thus received. When the ECU 15 determines that the user is wearing the wearable device 2 (Step S103: Yes), the driver-assistance device 1 proceeds to Step S104 to be described later. In contrast, when the ECU 15 determines that the user is not wearing the wearable device 2 (Step S103: No), the driver-assistance device 1 proceeds to Step S106 to be described later.

In Step S104, the ECU 15 determines, via the communication unit 14, whether the imaging device 21 of the wearable device 2 is recording a motion image. When the ECU 15 determines that the imaging device 21 of the wearable device 2 is recording a motion image (Step S104: Yes), the driver-assistance device 1 proceeds to Step S106 to be described later. In contrast, when the ECU 15 determines that the imaging device 21 of the wearable device 2 is not recording a motion image (Step S104: No), the driver-assistance device 1 proceeds to Step S105 to be described later.

In Step S105, the ECU 15 causes, via the communication unit 14, the imaging device 21 of the wearable device 2 to start to record a motion image. Specifically, the ECU 15 transmits, via the communication unit 14, a REC signal instructing the imaging device 21 of the wearable device 2 to take a motion image. Accordingly, when the user gets in the vehicle 100, the recording by the wearable device 2 is automatically started. After Step S105, the driver-assistance device 1 proceeds to Step S106 to be described later.

Subsequently, the ECU 15 determines whether the user is outside the vehicle 100 (Step S106). For example, the ECU 15 calculates the distance between the vehicle 100 and the wearable device 2 based on the position information detected by the GPS sensor 25 of the wearable device 2 acquired via the communication unit 14 and the position information detected by the GPS sensor 131 of the automotive navigation system 13 and determines whether the distance thus calculated is equal to or greater than the predetermined value. The ECU 15 determines that the user is outside the vehicle 100 when the distance is equal to or greater than the predetermined value and determines that the user is in the vehicle 100 when the distance is less than the predetermined value. Note that the ECU 15 may determine whether the user is outside the vehicle 100 based on the detection result input from the open and close sensor 12 and the detection result of the seat sensor 11. When the ECU 15 determines that the user is outside the vehicle 100 (Step S106: Yes), the driver-assistance device 1 proceeds to Step S107 to be described later. In contrast, when the ECU 15 determines that the user is in the vehicle 100 (Step S106: No), the driver-assistance device 1 proceeds to Step S111 to be described later.

In Step S107, the ECU 15 causes the imaging device 21 of the wearable device 2 to stop recording the motion image. Specifically, the ECU 15 transmits, via the communication unit 14, a stop signal causing the imaging device 21 of the wearable device 2 to stop recording the motion image.

Subsequently, the ECU 15 determines whether a recording instruction has been issued from the wearable device 2 or the server (not illustrated) via the communication unit 14 (Step S108). Specifically, in an emergency in a surrounding environment of the vehicle 100 such as a case where the vehicle 100 encounters a traffic accident, a fire, a natural disaster, and the like, the ECU 15 determines that the recording instruction has been issued from the server when a start signal that starts the recording transmitted from the server (not illustrated) has been input via the communication unit 14. Further, when the detection result of detecting the acceleration equal to or greater than a predetermined value has been input from the nine-axis sensor 22 of the wearable device 2 via the communication unit 14, the ECU 15 accepts the detection result as the start signal. When the ECU 15 determines that the recording instruction has been issued from the wearable device 2 or the server (not illustrated) (Step S108: Yes), the driver-assistance device 1 proceeds to Step S109 to be described later. In contrast, when the ECU 15 determines that the recording instruction has not been issued from the wearable device 2 or the server (not illustrated) (Step S108: No), the driver-assistance device 1 proceeds to Step S110 to be described later.

In Step S109, the ECU 15 transmits the REC signal to the imaging device 21 of the wearable device 2 via the communication unit 14 to record a motion image for a certain period of time. This allows, even in a case where restrictions have been imposed by the ECU 15 on the motion-image taking function to disable the recording, the wearable device 2 to start the recording when the user encounters a traffic accident, an event, or the like in a surrounding environment of the vehicle 100, allowing the recording to be used as an evidence motion image or allowing an unexpected situation such as a fire or a natural disaster to be recorded.

Subsequently, the ECU 15 determines whether the IG switch 10 has been turned to the off state (Step S110). When the ECU 15 determines that the IG switch 10 is in the off state (Step S110: Yes), the driver-assistance device 1 brings the present processing to an end. In contrast, when the ECU 15 determines that the IG switch 10 is not in the off state (Step S110: No), the driver-assistance device 1 returns to Step S101 described above.

In Step S111, the ECU 15 determines whether the user has taken off the wearable device 2. Specifically, the ECU 15 acquires the detection result from the wearing sensor 26 of the wearable device 2 via the communication unit 14 and determines whether the user has taken off the wearable device 2 based on the detection result thus acquired. When the ECU 15 determines that the user has taken off the wearable device 2 (Step S111: Yes), the driver-assistance device 1 proceeds to Step S107. In contrast, when the ECU 15 determines that the user has not taken off the wearable device 2 (Step S111: No), the driver-assistance device 1 proceeds to Step S110 to be described later.

According to the first embodiment described above, the ECU 15 performs the switching control on the function of acquiring information on privacy owned by the wearable device 2 based on the occupancy state of the user with respect to the vehicle 100, making it possible to prevent various pieces of information that can be acquired by the wearable device 2 from being used in an unintended manner for the user and the others, which in turn makes it possible to perform an operation taking into consideration privacy of the user and the others.

Further, according to the first embodiment, the ECU 15 determines whether the distance between the driver-assistance device 1 and the wearable device 2 is equal to or greater than the predetermined value, and, when determining that the distance between the driver-assistance device 1 and the wearable device 2 is equal to or greater than the predetermined value, the ECU 15 determines that the user is outside the vehicle 100 and stops the recording by the imaging device 21 of the wearable device 2, and, when determining that the distance between the driver-assistance device 1 and the wearable device 2 is less than the predetermined value, the ECU 15 determines that the user is in the vehicle 100 and starts the recording by the imaging device 21 of the wearable device 2, making it possible to prevent information that can be acquired by the wearable device 2 from being used in an unintended manner for the user and the others even when the user gets out of the vehicle 100 while wearing the wearable device 2 and to assist in driving using information acquired by the wearable device 2 while the user is in the vehicle 100.

Further, according to the first embodiment, the ECU 15 stops and disables, when determining that the user is in the vehicle 100 and is not wearing the wearable device 2, the recording by the imaging device 21 of the wearable device 2, and starts, when determining that the user is in the vehicle 100 and is wearing the wearable device 2, the recording by the imaging device 21 of the wearable device 2, making it possible to prevent the wearable device 2 from acquiring information until the user who tends to wear the wearable device 2 only when the user is in the vehicle 100 puts on the wearable device 2, which in turn makes it possible to perform an operation taking into consideration privacy of the user and the others and reduce power consumption of the wearable device 2.

Further, according to the first embodiment, when the start signal is input from the server while the imaging device 21 of the wearable device 2 is prevented from taking a motion image, the ECU 15 causes the imaging device 21 of the wearable device 2 to start to take a motion image, making it possible to cause the imaging device 21 of the wearable device 2 to start the recording in an emergency even when the user is outside the vehicle 100 or the user has finished driving the vehicle 100, which in turn makes it possible to use the recording as an evidence motion image and to record an unexpected situation such as a fire or a natural disaster.

Further, according to the first embodiment, the ECU 15 performs the switching control on at least one of the motion-image taking function of taking a motion image by the wearable device 2, the recording function of recording motion image data, the transmitting function of transmitting at least one of the motion image data, the position information, and the vital information, the acquiring function of acquiring the position information by the GPS sensor 25, and the projecting function of projecting an image by the projection unit 24, making it possible to prevent various pieces of information that can be acquired by the wearable device 2 from being used in an unintended manner for the user and the others, which in turn makes it possible to perform an operation taking into consideration privacy of the user and the others.

Note that, according to the first embodiment, the ECU 15 may determine the occupancy state of the user with respect to the vehicle 100 based on a state of the IG switch 10 or a state of an activation switch (READY switch) that activates the power supply of the vehicle 100. In this case, the ECU 15 determines whether the state of the IG switch 10 or the state of the activation switch is the off state. The ECU 15 determines that the user is outside the vehicle 100 when the state of the IG switch 10 or the state of the activation switch is the off state and then stops the recording of the motion image by the imaging device 21 of the wearable device 2, and determines that the user is in the vehicle 100 when the state of the IG switch 10 or the state of the activation switch is the on state and then starts the recording of the motion image by the imaging device 21 of the wearable device. Accordingly, even when the user finishes driving the vehicle 100 and gets out of the vehicle 100 while wearing the wearable device 2, it is possible to prevent various pieces of information that can be acquired by the wearable device 2 from being used in an unintended manner for the user and the others, and when the user gets in the vehicle 100 and starts to drive the vehicle 100, it is possible to acquire various pieces of information with the wearable device 2, which in turn makes it possible to assist in driving using information acquired by the wearable device 2.

Further, according to the first embodiment, the ECU 15 may determine the occupancy state of the user with respect to the vehicle 100 based on a signal strength of a signal received from the wearable device 2. In this case, the ECU 15 determines whether the signal strength of the signal received from the wearable device 2 is less than a predetermined value. The ECU 15 determines that the user is outside the vehicle 100 when the signal strength is less than the predetermined value and then stops the recording by the imaging device 21 of the wearable device 2, and determines that the user is in the vehicle 100 when the signal strength is equal to or greater than the predetermined value and then stops the recording by the imaging device 21 of the wearable device 2 and then starts the recording by the imaging device 21 of the wearable device. Accordingly, even when the user gets out of the vehicle 100 while wearing the wearable device 2, it is possible to prevent various pieces of information that can be acquired by the wearable device 2 from being used in an unintended manner for the user and the others, and when the user gets in the vehicle 100, it is possible to acquire various pieces of information with the wearable device 2, which in turn makes it possible to assist in driving using information acquired by the wearable device 2.

Further, according to the first embodiment, the ECU 15 may determine whether the user is in the vehicle 100 based on the detection result input from the open and close sensor 12 and the detection result of the seat sensor 11. In this case, the ECU 15 determines whether the door of the vehicle 100 is opened based on the detection result acquired from the open and close sensor 12. When determining that the door of the vehicle 100 is opened, the ECU 15 determines whether the user is seated on the driver's seat based on the detection result of the seat sensor 11, and, when determining that the user is seated on the driver's seat, the ECU 15 determines that the user is in the vehicle 100, and then starts the recording of the motion image by the imaging device 21 of the wearable. In contrast, the ECU 15 determines that the user is outside the vehicle 100 when determining that the user is not seated on the driver's seat and stops the recording of the motion image by the imaging device 21 of the wearable device 2. Accordingly, even when the user finishes driving the vehicle 100 and gets out of the vehicle 100 while wearing the wearable device 2, it is possible to prevent various pieces of information that can be acquired by the wearable device 2 from being used in an unintended manner for the user and the others, and when the user gets in the vehicle 100 and starts to drive the vehicle 100, it is possible to assist in driving using information acquired by the wearable device 2.

Further, according to the first embodiment, the ECU 15 may determine the occupancy state of the user with respect to the vehicle 100 based on the image data captured by the imaging device 21 of the wearable device 2. In this case, the ECU 15 stops, when determining that the user is outside the vehicle 100 based on the image data captured by the imaging device 21 of the wearable device 2, at least one of the recording function of recording motion image data by the wearable device 2, the transmitting function of the wearable device 2, and the projecting function of projecting an image by the projection unit 24, and starts, when determining that the user is in the vehicle 100, at least one of the transmitting function of the wearable device 2, the recording function, and the projecting function of projecting an image by the projection unit 24. Accordingly, even when the user gets out of the vehicle while wearing the wearable device, it is possible to prevent various pieces of information that can be acquired by the wearable device from being used in an unintended manner for the user and the others, and when the user gets in the vehicle, it is possible to acquire various pieces of information with the wearable device, which in turn makes it possible to assist in driving using information acquired by the wearable device 2.

Further, according to the first embodiment, the ECU 15 may switch display contents of the image projected by the projection unit 24 of the wearable device based on the occupancy state of the user. Specifically, the ECU 15 determines whether the distance between the driver-assistance device 1 and the wearable device 2 is equal to or greater than the predetermined value, and, when determining that the distance between the driver-assistance device 1 and the wearable device 2 is equal to or greater than the predetermined value, the ECU 15 determines that the user is outside the vehicle 100 and switches the image projected by the projection unit 24 to display contents suitable for the user walking. Herein, the display contents suitable for the user walking include to information on nearby sites based on the GPS sensor 25 such as gourmet food information, event information, and sightseeing spot information. In contrast, when determining that the distance between the driver-assistance device 1 and the wearable device 2 is less than the predetermined value, the ECU 15 determines that the user is in the vehicle 100 and switches the image projected by the projection unit 24 to display contents that assist the user in driving. Herein, the display contents that assist in driving include speed information of the vehicle 100, map information and road information transmitted from the automotive navigation system 13 of the driver-assistance device 1, and the like. According to this configuration, display contents on the image to be projected by the wearable device 2 are switched in accordance with the occupancy state of the user, making it possible to provide a display in accordance with the occupancy state of the user.

Further, according to the first embodiment, the ECU 15 calculates the distance between the vehicle 100 and the wearable device 2 based on the position information detected by the GPS sensor 25 of the wearable device 2 acquired via the communication unit 14 and the position information detected by the GPS sensor 131 of the automotive navigation system 13. Alternatively, the ECU 15 may calculate the distance between the vehicle 100 and the wearable device 2 based on image data acquired through vehicle-to-vehicle communication with another vehicle or road-to-vehicle communication via the communication unit 14, for example.

Further, according to the first embodiment, the ECU 15 may acquire, from the server (not illustrated) via the communication unit 14 and the network, the position information on the wearable device 2 uploaded to the server by the wearable device 2 and calculate the distance between the vehicle 100 and the wearable device 2 based on the position information on the wearable device thus acquired and the position information detected by the GPS sensor 131 of the automotive navigation system 13. It is needless to say that the ECU 15 may acquire image data captured by the imaging device 21 of the wearable device 2 from the server in addition to the position information on the wearable device 2 via the communication unit 14 and the network and then determine the occupancy state indicating the relative positional relation between the vehicle 100 and the user.

Second Embodiment

Next, a description will be given of a second embodiment. A driver-assistance system according to the second embodiment has the same components as the components of the driver-assistance system 1000 according to the first embodiment described above, but processing to be executed by the wearable device is different. Specifically, according to the first embodiment described above, the driver-assistance device 1 provided in the vehicle 100 performs the switching control on the recording function of the wearable device 2 based on the occupancy state of the user. In contrast, according to the second embodiment, the wearable device performs the switching control on the recording function based on the occupancy state of the user. Hereinafter, a description will be given of the processing to be executed by the wearable device according to the second embodiment. Note that the same components as the components of the driver-assistance system 1000 according to the first embodiment described above are denoted by the same reference numerals, and detailed descriptions of the components will not be given.

Processing in Wearable Device

Figure 5:
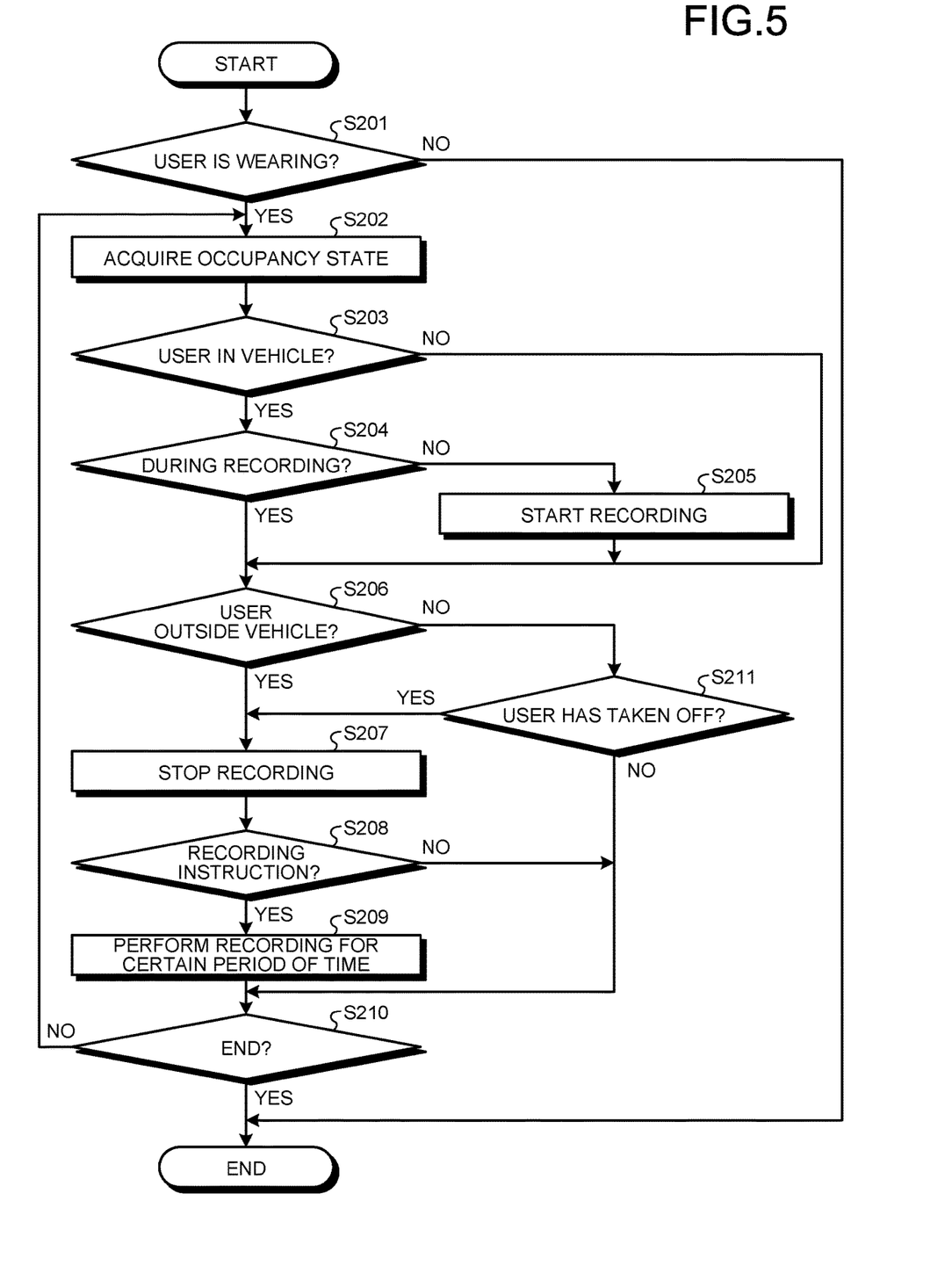
FIG. 5 is a flowchart illustrating an outline of processing to be executed by a wearable device according to a second embodiment.

A description will be given of processing to be executed by the wearable device 2 according to the second embodiment. FIG. 5 is a flowchart illustrating an outline of the processing to be executed by the wearable device 2.

As illustrated in FIG. 5, the control unit 27 first determines whether the user is wearing the wearable device 2 based on the wearing signal indicating the detection result input from the wearing sensor 26 (Step S201). When the control unit 27 determines that the user is wearing the wearable device 2 (Step S201: Yes), the wearable device 2 proceeds to Step S202 to be described later. In contrast, when the control unit 27 determines that the user is not wearing the wearable device 2 (Step S201: No), the wearable device 2 brings the processing to an end.

Subsequently, the control unit 27 acquires the occupancy state indicating the relative positional relation between the vehicle 100 and the user from the driver-assistance device 1 via the communication unit 20 (Step S202) and determines whether the user is in the vehicle 100 (Step S203). Specifically, the control unit 27 calculates the distance between the vehicle 100 and the wearable device 2 based on the position information on the vehicle 100 received from the GPS sensor 131 of the driver-assistance device 1 via the communication unit 20 and the position information calculated by the GPS sensor 25 and determines whether the distance is equal to or greater than the predetermined value. The control unit 27 determines that the user is outside the vehicle 100 when determining that the distance is equal to or greater than the predetermined value, and determines that the user is in the vehicle 100 when determining that the distance is less than the predetermined value. When the control unit 27 determines that the user is in the vehicle 100 (Step S203: Yes), the wearable device 2 proceeds to Step S204 to be described later. In contrast, when the control unit 27 determines that the user is not in the vehicle 100 (Step S203: No), the wearable device 2 proceeds to Step S206 described later.

Step S204 to Step S211 correspond to the above-described Step S104 to Step S111 in FIG. 4, respectively.

According to the second embodiment described above, the control unit 27 performs the switching control on a predetermined function capable of acquiring information on privacy owned by the wearable device 2 based on the occupancy state of the user with respect to the vehicle 100, making it possible to prevent various pieces of information that can be acquired by the wearable device 2 from being used in an unintended manner for the user and the others, which in turn makes it possible to assist in driving using information acquired by the wearable device 2.

Note that, according to the second embodiment, the control unit 27 determines the occupancy state indicating the relative positional relation between the vehicle 100 and the user based on the distance between the driver-assistance device 1 and the wearable device 2. Alternatively, as in the first embodiment, the control unit 27 may determine the occupancy state indicating the relative positional relation between the vehicle 100 and the user based on at least one of the state of the IG switch 10 or the state of the activation switch (READY switch) that activates the power supply of the vehicle 100, the detection result of the seat sensor 11 or the open and close sensor 12, the signal strength of the signal received from the wearable device 2, and the image data captured by the imaging device 21 of the wearable device 2 in addition to the distance.

Further, according to the second embodiment, the control unit 27 acquires the occupancy state from the driver-assistance device 1. Alternatively, for example, the control unit 27 may communicate with a different vehicle via the communication unit 20 through vehicle-to-vehicle communication or road-to-vehicle communication to acquire image data resulting from imaging the vehicle 100 and the user wearing the wearable device 2 by the different vehicle, determine the occupancy state of the user with respect to the vehicle 100, and then perform the switching control on the predetermined function capable of acquiring information on privacy owned by the wearable device 2 based on the determination result.

Furthermore, according to the second embodiment, the control unit 27 may acquire, from the server (not illustrated) via the communication unit 20 and the network, the occupancy state indicating the relative positional relation between the vehicle 100 and the user uploaded to the server by the driver-assistance device 1 and perform the switching control on the predetermined function capable of acquiring information on privacy owned by the wearable device 2 based on the occupancy state thus acquired.

Third Embodiment

Next, a description will be given of a third embodiment. According to the first embodiment described above, the ECU 15 of the driver-assistance device 1 switches the recording function of the wearable device 2 based on the occupancy state of the user, but, according to the third embodiment, the server acquires the occupancy state from both the driver-assistance device and the wearable device and performs the switching control on the recording function of the wearable device. Note that the same components as the components of the driver-assistance system 1000 according to the first embodiment described above are denoted by the same reference numerals, and detailed descriptions of the components will not be given.

Figure 6:
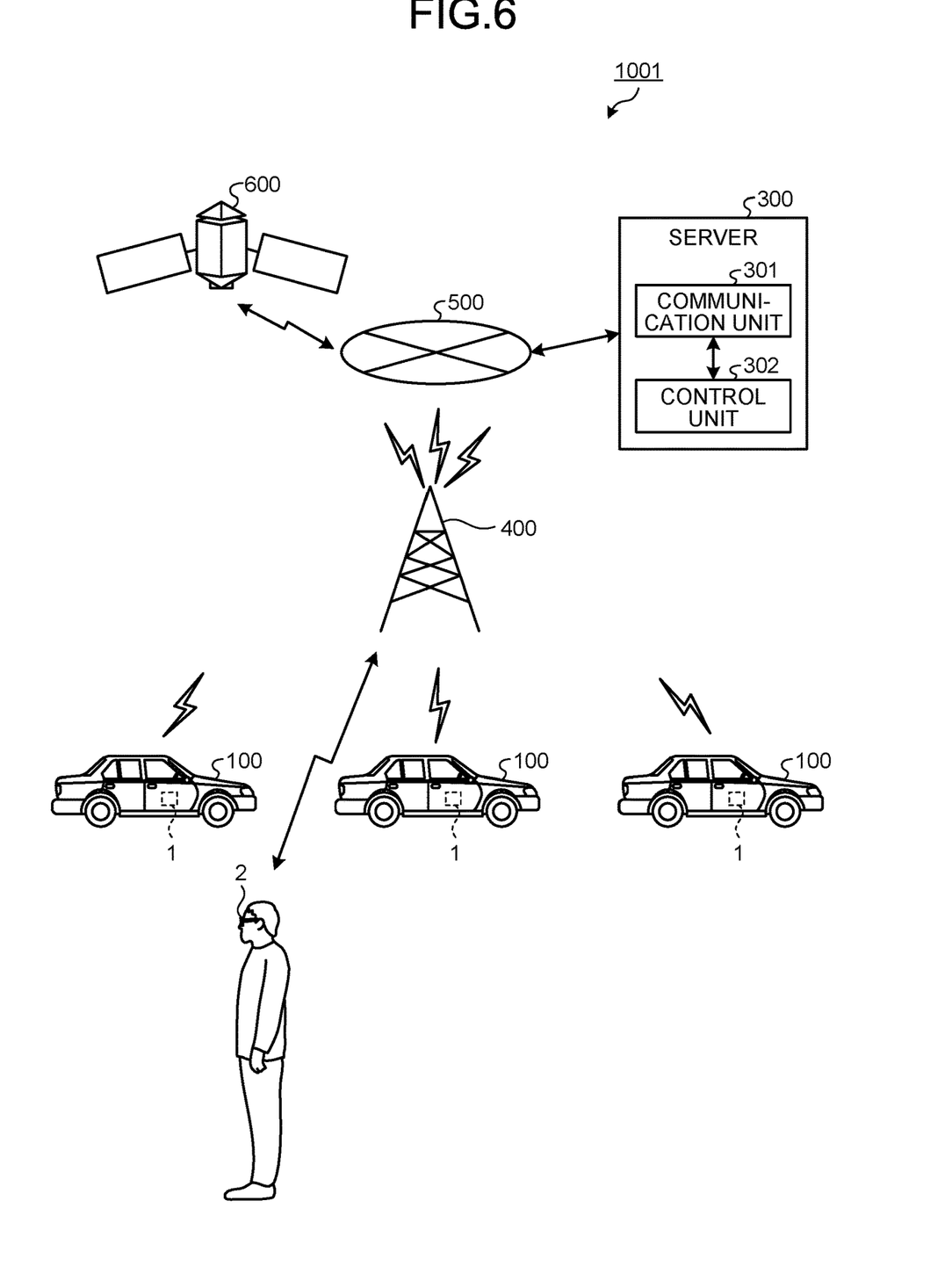
FIG. 6 is a schematic diagram illustrating a schematic configuration of a driver-assistance system according to a third embodiment.

FIG. 6 is a schematic diagram illustrating a schematic configuration of a driver-assistance system according to the third embodiment. A driver-assistance system 1001 illustrated in FIG. 6 includes the driver-assistance device 1 mounted on each of the plurality of vehicles 100, the wearable device 2 worn by the user U1, and a server 300. The plurality of driver-assistance devices 1, the wearable device 2, and the server 300 are capable of communicating information with each other via a base station 400 and a network 500. Further, the server 300 acquires, from a GPS satellite 600 via the base station 400 and the network 500, image data that results from imaging the vehicles 100 from above or image data produced from an image acquired from a different vehicle through vehicle-to-vehicle communication.

Configuration of Server

Next, a description will be given of a configuration of the server 300. The server 300 includes a communication unit 301 and a control unit 302.

The communication unit 301 transmits and receives, under control of the control unit 302, various pieces of information via the network 500 and the base station 400 in accordance with a predetermined communication standard. Further, the communication unit 301 transmits various pieces of information to the driver-assistance device 1 of each of the vehicles 100 and the wearable device 2 in accordance with a predetermined communication standard and receives various pieces of information from the GPS satellite 600, the driver-assistance device 1 of each of the vehicles 100, and the wearable device 2 under the control of the control unit 302. The communication unit 301 includes a communication module capable of radio communication. Note that, according to the third embodiment, the function of the driver-assistance device 1 may be implemented in the wearable device 2.

The control unit 302 includes a memory and a processor including hardware such as a CPU or an AI chip that includes a plurality of neural networks and is used in machine learning such as deep learning. The control unit 302 determines whether the user U1 is in the vehicle 100 based on the position information on the vehicle 100 on which the driver-assistance device 1 is mounted and the position information on the wearable device 2 via the communication unit 301. The control unit 302 transmits, to the wearable device 2, the REC signal that causes the wearable device 2 to start the recording of a motion image when the user U1 is in the vehicle 100, and transmits, to the wearable device 2, the stop signal that causes the wearable device 2 to stop the recording of a motion image when the user U1 is outside the vehicle 100. Note that the control unit 302 may acquire the image data from the GPS satellite 600, calculate the distance between the vehicle 100 and the wearable device 2 from an image corresponding to the image data thus acquired, and, when the distance is less than the predetermined value, determine that the user U1 is in the vehicle 100 and transmit the REC signal to the wearable device 2.

According to the third embodiment described above, the control unit 302 determines whether the user is in the vehicle 100 based on the position information on the vehicle 100 on which the driver-assistance device 1 is mounted and the position information on the wearable device 2 via the communication unit 301. The control unit 302 transmits, to the wearable device 2, the REC signal that causes the wearable device 2 to start the recording of a motion image when the user U1 is in the vehicle 100, and transmits, to the wearable device 2, the stop signal that causes the wearable device 2 to stop the recording of a motion image when the user U1 is outside the vehicle 100, making it possible to prevent various pieces of information that can be acquired by the wearable device 2 from being used in an unintended manner for the user and the others even when the user gets out of the vehicle 100 while wearing the wearable device 2, and to acquire various pieces of information with the wearable device 2 when the user gets in the vehicle 100, which in makes it possible to assist in driving using information acquired by the wearable device 2.

Note that, according to the third embodiment, the control unit 302 determines the occupancy state indicating the relative positional relation between the vehicle 100 and the user based on the distance between the driver-assistance device 1 and the wearable device 2. Alternatively, as in the first embodiment, the control unit 302 may determine the occupancy state indicating the relative positional relation between the vehicle 100 and the user based on at least one of the state of the IG switch 10 or the state of the activation switch (READY switch) that activates the power supply of the vehicle 100, the detection result of the seat sensor 11 or the open and close sensor 12, the signal strength of the signal received from the wearable device 2, and the image data captured by the imaging device 21 of the wearable device 2 in addition to the distance.

Further, according to the third embodiment, the control unit 302 determines the occupancy state indicating the relative positional relation between the vehicle 100 and the user based on the distance between the driver-assistance device 1 and the wearable device 2. Alternatively, the control unit 302 may determine the occupancy state indicating the relative positional relation between the vehicle 100 and the user based on, for example, the image data captured by a different vehicle 100 or the information acquired through vehicle-to-vehicle communication or road-to-vehicle communication.

Modifications According to First to Third Embodiments

Figure 7:
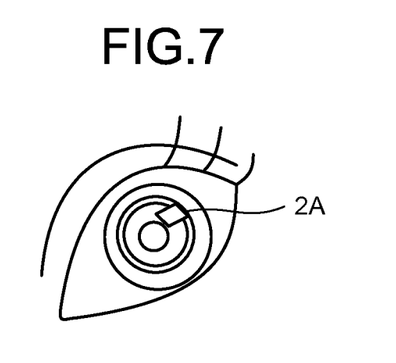
FIG. 7 is a diagram illustrating a schematic configuration of a wearable device according to a modification of the first to third embodiments.
Figure 8:
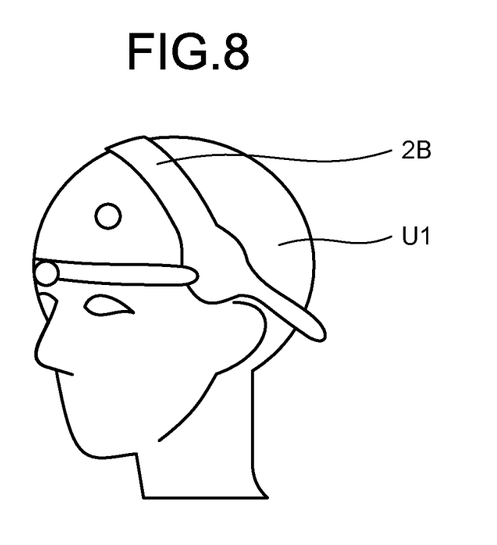
FIG. 8 is a diagram illustrating a schematic configuration of another wearable device according to the modification of the first to third embodiments.
Figure 9:
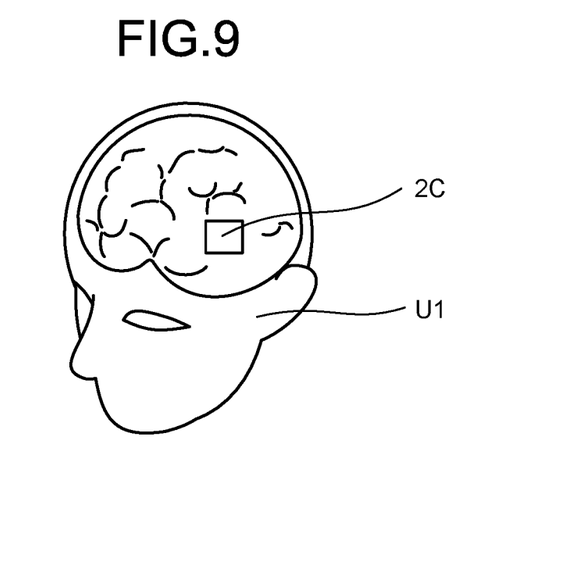
FIG. 9 is a diagram illustrating a schematic configuration of yet another wearable device according to the modification of the first to third embodiments.
Figure 10:
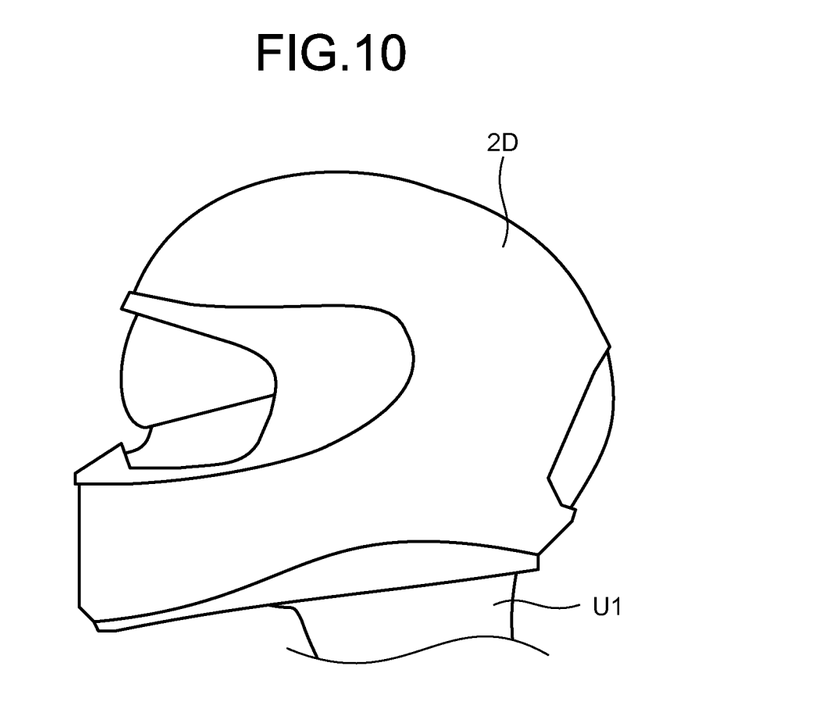
FIG. 10 is a diagram illustrating a schematic configuration of yet another wearable device according to the modification of the first to third embodiments.

Note that, in the first to third embodiments, the description has been given of the example using the glasses-type wearable device 2 that can be worn by the driver, but the disclosure is not limited to such an example and is applicable to various wearable devices. For example, as illustrated in FIG. 7, the disclosure is also applicable to a contact-lens-type wearable device 2A capable of taking an image. Furthermore, the disclosure is also applicable to even a device such as a wearable device 2B illustrated in FIG. 8 or a brain-chip-type wearable device 2C illustrated in FIG. 9 that directly communicates with a brain of the user U1. Furthermore, like a wearable device 2D of FIG. 10, a helmet-shaped device having a visor may be used. This configuration allows the wearable device 2D to project and display an image on the visor.

Further, according to the first to third embodiments, the wearable device 2 projects an image onto the retina of the driver to cause the driver to view the image. Alternatively, the wearable device 2 may be configured to project an image onto a lens of, for example, glasses.

Other Embodiments

Further, according to the first to third embodiments, the "unit" described above can be read as a "circuit" or the like. For example, the control unit can be read as a control circuit.

Further, in the driver-assistance device according to the first to third embodiments, the ECU or the control unit performs the switching control on the operation of the function of acquiring information on privacy owned by the wearable device, but the disclosure is not limited to such a configuration, and a device including a device other than an ECU or a graphics processing unit (GPU) and more suitable than an ECU or a GPU such as a field programmable gate array (FPGA) or a digital signal processing (DSP), a memory, and the like, or an Ai chip used in machine learning using a neural network for data processing and image processing may perform the switching control.

Further, a program to be executed by the driver-assistance device and the wearable device according to the first to third embodiments is installable or executable file data, and the program is recorded in a computer-readable recording medium such as a CD-ROM, a flexible disk (FD), a CD-R, a digital versatile disk (DVD), a USB medium, or a flash memory and then distributed.

Further, the program to be executed by the driver-assistance device and the wearable device according to the first to third embodiments may be stored on a computer connected to a network such as the Internet and distributed through downloading via the network.

Note that, in the description of the flowcharts herein, the words such as "first", "thereafter", and "subsequently" are used to explicitly show the sequential relation among steps, but the order of processes required to implement the embodiments is not uniquely determined by such words. That is, the order of processes in the flowcharts illustrated herein may be changed on condition that no contradiction occurs.

According to the disclosure, even when the user gets out of the vehicle while wearing the wearable device, the processor can stop the function of acquiring information on privacy owned by the wearable device so as to prevent information that can be acquired by the wearable device from being used in an unintended manner for the user and the others, and, when the user gets in the vehicle, the processor can start the function of acquiring information on privacy owned by the wearable device so as to assist in driving using information acquired by the wearable device.

According to the disclosure, even when the user finishes driving the vehicle and gets out of the vehicle while wearing the wearable device, the processor can stop the function of acquiring information on privacy owned by the wearable device so as to prevent information that can be acquired by the wearable device from being used in an unintended manner for the user and the others, and, when the user gets in the vehicle and starts to drive the vehicle, the processor can start the function of acquiring information on privacy owned by the wearable device so as to assist in driving using information acquired by the wearable device.

According to the disclosure, even when the user gets out of the vehicle while wearing the wearable device, the processor can stop the function of acquiring information on privacy owned by the wearable device so as to prevent information that can be acquired by the wearable device from being used in an unintended manner for the user and the others, and, when the user gets in the vehicle, the processor can start the function of acquiring information on privacy owned by the wearable device so as to assist in driving using information acquired by the wearable device.

According to the disclosure, even when the user finishes driving the vehicle and gets out of the vehicle while wearing the wearable device, the processor can stop the function of acquiring information on privacy owned by the wearable device so as to prevent information that can be acquired by the wearable device from being used in an unintended manner for the user and the others, and, when the user gets in the vehicle and starts to drive the vehicle, the processor can start the function of acquiring information on privacy owned by the wearable device so as to assist in driving using information acquired by the wearable device.

According to the disclosure, even when the user gets out of the vehicle while wearing the wearable device, the processor can stop the function of acquiring information on privacy owned by the wearable device so as to prevent information that can be acquired by the wearable device from being used in an unintended manner for the user and the others, and, when the user gets in the vehicle, the processor can start the function of acquiring information on privacy owned by the wearable device so as to assist in driving using information acquired by the wearable device.

According to the disclosure, even when the user gets out of the vehicle while wearing the wearable device, the processor can stop the function of acquiring information on privacy owned by the wearable device so as to prevent information that can be acquired by the wearable device from being used in an unintended manner for the user and the others, and, when the user gets in the vehicle, the processor can start the function of acquiring information on privacy owned by the wearable device so as to assist in driving using information acquired by the wearable device.

According to the disclosure, even when the user is in the vehicle, it is possible to prevent the wearable device from acquiring information until the user puts on the wearable device, which in turn makes it possible to perform an operation taking into consideration privacy of the user and the others.

According to the disclosure, even when the user is outside the vehicle, the wearable device can acquire various pieces of information in an emergency, allowing such information to be used as evidence or allowing an unexpected situation such as a fire or a natural disaster to be recorded.

According to the disclosure, at least one of the motion-image taking function, the recording function, the transmitting function, and the projecting function is restricted in accordance with the occupancy state of the user, making it possible to perform an operation taking into consideration privacy of the user and the others.

According to the disclosure, display contents on the image to be projected by the wearable device are switched in accordance with the occupancy state of the user, making it possible to provide a display in accordance with the occupancy state of the user.

According to the disclosure, the wearable device performs the switching control on a predetermined function related to privacy based on the occupancy state of the user with respect to the vehicle, making it possible to prevent various pieces of information that can be acquired by the wearable device from being used in an unintended manner for the user and the others, which in turn makes it possible to perform an operation taking into consideration privacy of the user and the others.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driver-assistance device comprising:
   a memory; and
   a processor including hardware, the processor being configured to perform switching control on an operation of a function that is included in a wearable device to be worn by a user and that acquires information on privacy, based on an occupancy state indicating a relative positional relation between a vehicle and the user, wherein
   the processor is further configured to
      determine whether a distance between the driver-assistance device and the wearable device is equal to or greater than a predetermined value,
      when determining that the distance is equal to or greater than the predetermined value, determine that the user is outside the vehicle and stop the function, and
      when determining that the distance is less than the predetermined value, determine that the user is in the vehicle and start the function.

2. The driver-assistance device according to claim 1, wherein
   the processor is configured to
      determine whether the user is wearing the wearable device, based on a wearing signal transmitted from the wearable device, the wearing signal indicating a wearing state of the wearable device of the user,
      when determining that the user is in the vehicle and that the user is not wearing the wearable device, stop the function, and
      when determining that the user is in the vehicle and that the user is wearing the wearable device, start the function.

3. The driver-assistance device according to claim 1, wherein
   the processor is configured to start the function that is being stopped when a start signal that starts the operation of the function is input.

4. The driver-assistance device according to claim 1, wherein
   the wearable device includes
      an imaging sensor configured to take a motion image;
      a GPS sensor configured to acquire position information;
      a vital sensor configured to acquire vital information on the user; and
      a projector configured to project an image on a predetermined position, and
   the function includes at least one of a motion-image taking function of taking the motion image by the imaging sensor, a recording function of recording motion image data captured by the imaging sensor, a transmitting function of transmitting at least one of the motion image data captured by the imaging sensor, the position information acquired by the GPS sensor, and the vital information acquired by the vital sensor, an acquiring function of acquiring the position information by the GPS sensor, and a projecting function of projecting the image by the projector.

5. A driver-assistance device comprising:
   a memory; and
   a processor including hardware, the processor being configured to perform switching control on an operation of a function that is included in a wearable device to be worn by a user and that acquires information on privacy, based on an occupancy state indicating a relative positional relation between a vehicle and the user, wherein
   the processor is further configured to
      determine whether a signal strength of a signal received from the wearable device is less than a predetermined value, when the signal strength is less than the predetermined value, determine that the user is outside the vehicle and stop the function, and when the signal strength is equal to or greater than the predetermined value, determine that the user is in the vehicle and starts the function.

6. The driver-assistance device according to claim 5, wherein the processor is configured to determine whether the user is wearing the wearable device, based on a wearing signal transmitted from the wearable device, the wearing signal indicating a wearing state of the wearable device of the user, when determining that the user is in the vehicle and that the user is not wearing the wearable device, stop the function, and when determining that the user is in the vehicle and that the user is wearing the wearable device, start the function.

7. The driver-assistance device according to claim 5, wherein the processor is configured to start the function that is being stopped when a start signal that starts the operation of the function is input.

8. The driver-assistance device according to claim 5, wherein the wearable device includes an imaging sensor configured to take a motion image;

a GPS sensor configured to acquire position information;

a vital sensor configured to acquire vital information on the user; and a projector configured to project an image on a predetermined position, and the function includes at least one of a motion-image taking function of taking the motion image by the imaging sensor, a recording function of recording motion image data captured by the imaging sensor, a transmitting function of transmitting at least one of the motion image data captured by the imaging sensor, the position information acquired by the GPS sensor, and the vital information acquired by the vital sensor, an acquiring function of acquiring the position information by the GPS sensor, and a projecting function of projecting the image by the projector.

9. A driver-assistance device comprising:

a memory; and a processor including hardware, the processor being configured to perform switching control on an operation of a function that is included in a wearable device to be worn by a user and that acquires information on privacy, based on an occupancy state indicating a relative positional relation between a vehicle and the user, wherein the processor is further configured to determine the occupancy state based on image data transmitted from the wearable device, when determining that the user is outside the vehicle, stop the function, and when determining that the user is in the vehicle, start the function.

10. The driver-assistance device according to claim 9, wherein the processor is configured to determine whether the user is wearing the wearable device, based on a wearing signal transmitted from the wearable device, the wearing signal indicating a wearing state of the wearable device of the user, when determining that the user is in the vehicle and that the user is not wearing the wearable device, stop the function, and when determining that the user is in the vehicle and that the user is wearing the wearable device, start the function.

11. The driver-assistance device according to claim 9, wherein the processor is configured start the function that is being stopped when a start signal that starts the operation of the function is input.

12. The driver-assistance device according to claim 9, wherein the wearable device includes an imaging sensor configured to take a motion image;

a GPS sensor configured to acquire position information;

a vital sensor configured to acquire vital information on the user; and a projector configured to project an image on a predetermined position, and the function includes at least one of a motion-image taking function of taking the motion image by the imaging sensor, a recording function of recording motion image data captured by the imaging sensor, a transmitting function of transmitting at least one of the motion image data captured by the imaging sensor, the position information acquired by the GPS sensor, and the vital information acquired by the vital sensor, an acquiring function of acquiring the position information by the GPS sensor, and a projecting function of projecting the image by the projector.

* * * * *